United States Patent
Ito

(10) Patent No.: US 12,031,038 B2
(45) Date of Patent: Jul. 9, 2024

(54) TREAD RUBBER COMPOSITION AND PNEUMATIC TIRE

(71) Applicant: SUMITOMO RUBBER INDUSTRIES, LTD., Hyogo (JP)

(72) Inventor: Hiroshi Ito, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/542,448

(22) Filed: Aug. 16, 2019

(65) Prior Publication Data

US 2020/0079936 A1  Mar. 12, 2020

(30) Foreign Application Priority Data

Sep. 12, 2018  (JP) ................. 2018-170572

(51) Int. Cl.
  *C08L 9/06* (2006.01)
  *B60C 1/00* (2006.01)

(52) U.S. Cl.
  CPC .............. *C08L 9/06* (2013.01); *B60C 1/0016* (2013.01); *C08L 2201/08* (2013.01); *C08L 2205/025* (2013.01); *C08L 2205/035* (2013.01); *C08L 2207/324* (2013.01)

(58) Field of Classification Search
  CPC .. C08L 9/06; C08L 2201/08; C08L 2205/035; C08L 2205/025; C08L 2207/324; C08L 21/00; B60C 1/0016

USPC .......................................................... 524/526
  See application file for complete search history.

(56) References Cited

U.S. PATENT DOCUMENTS

| 6,110,985 | A | * | 8/2000 | Wheeler | B32B 5/18 521/83 |
| 2012/0157568 | A1 | * | 6/2012 | Sandstrom | C08L 9/06 523/156 |
| 2013/0289197 | A1 | * | 10/2013 | Pavon Sierra | C08L 9/06 524/526 |
| 2015/0126674 | A1 | * | 5/2015 | Sato | C08L 3/04 524/526 |

FOREIGN PATENT DOCUMENTS

| JP | 2005263956 A | 9/2005 |
| JP | 2013-071938 A | 4/2013 |
| JP | 2014-012798 A | 1/2014 |
| JP | 2018-131501 A | 8/2018 |
| JP | 2018-131502 A | 8/2018 |
| JP | 2018-135500 A | 8/2018 |

\* cited by examiner

*Primary Examiner* — Ling Siu Choi
*Assistant Examiner* — Ronald Grinsted
(74) *Attorney, Agent, or Firm* — GREENBLUM & BERNSTEIN, P.L.C.

(57) ABSTRACT

Provided are a tread rubber composition and a pneumatic tire, which exhibit excellent wet grip performance when thermally damaged. A tread rubber composition having acetone extractable contents before and after heat aging (denoted by "AEf" and "AEo", respectively) that satisfy the following relationships 1) and 2):
  1) $AEf \geq 16.0\%$;
  2) $AEo/AEf \times 100 \geq 95\%$.

2 Claims, No Drawings

TREAD RUBBER COMPOSITION AND PNEUMATIC TIRE

TECHNICAL FIELD

The present invention relates to a tread rubber composition and a pneumatic tire.

BACKGROUND ART

The tread rubber of pneumatic tires, which comes in contact with the road, requires properties such as wet grip performance for safety and other reasons. One conventional method includes incorporating an inorganic filler such as silica to improve wet grip performance. However, silica-containing compositions tend to have reduced processability. To secure processability, oil is generally used.

For example, Patent Literature 1 discloses a tread rubber composition that contains specific silica and plant-derived oil, an epoxidized natural rubber, and an anionic surfactant and has excellent wet grip performance, etc. Still, to meet the demanding wet grip performance requirements, it is desirable for such a tread rubber composition to not only have excellent initial wet grip performance, but also to maintain the wet grip performance even when it is damaged, e.g., thermally damaged.

CITATION LIST

Patent Literature

Patent Literature 1: JP 2005-263956 A

SUMMARY OF INVENTION

Technical Problem

The present invention aims to solve the problem and provide a tread rubber composition and a pneumatic tire, which exhibit excellent wet grip performance when thermally damaged.

Solution to Problem

The present invention relates to a tread rubber composition, having acetone extractable contents before and after heat aging (denoted by "AEf" and "AEo", respectively) that satisfy the following relationships 1) and 2):
1) $AEf \geq 16.0\%$;
2) $AEo/AEf \times 100 \geq 2.95\%$.

The rubber composition preferably contains silica and at least one of a liquid polymer or a resin.

The rubber composition preferably has an acetone extractable content before heat aging "AEf" of 22.0% or higher.

Another aspect of the present invention relates to a pneumatic tire, including a tread containing the rubber composition.

Advantageous Effects of Invention

The tread rubber composition of the present invention has acetone extractable contents before and after heat aging (denoted by "AEf" and "AEo", respectively) that satisfy relationships 1) and 2). This tread rubber composition provides improved wet grip performance when thermally damaged.

DESCRIPTION OF EMBODIMENTS

The tread rubber composition of the present invention (vulcanized tread rubber composition) has acetone extractable contents before and after heat aging (denoted by "AEf" and "AEo", respectively) that satisfy relationships 1) and 2). Thus, excellent wet grip performance is provided to the thermally damaged tread rubber composition.

The reason why this rubber composition has the above effect is not clear, but may be explained as follows.

For example, when a silica-containing composition contains a large amount of oil to secure processability, it shows good initial wet grip performance, but the wet grip performance degrades with time. It is first contemplated that this may be because the oil gradually migrates to other tire components with time, and the thermally damaged tread has a reduced acetone extractable content (a reduced content of plasticizers such as oils) and therefore an increased hardness, thereby resulting in degraded wet grip performance. Thus, it is considered that when AEf (acetone extractable content before heat aging or initial acetone extractable content) is adjusted to satisfy relationship 1), and further AEf and AEo (acetone extractable content after heat aging) are adjusted to satisfy relationship 2), a decrease in acetone extractable content caused by thermal damage and therefore degradation of wet grip performance with time can be reduced while ensuring processability. It is therefore believed that a rubber composition satisfying relationships 1) and 2), even when thermally damaged, can maintain good wet grip performance while ensuring good processability.

The rubber composition satisfying relationships 1) and 2) can be obtained, for example, by using a resin or liquid polymer having excellent compatibility with the polymer (rubber component) as a plasticizer instead of oil. It is first contemplated that when a material having excellent compatibility with the rubber component is used instead of oil, the material can be inhibited from migrating to other tire components due to its compatibility with the rubber component. Thus, it is believed that when a resin or a liquid polymer is used as a material having excellent compatibility with the rubber component in an amount within the range of relationship 1), the resin or liquid polymer can be effectively inhibited from migrating to other tire components, and therefore the decrease in acetone extractable content (plasticizer content) of the thermally damaged tread can be reduced to further satisfy relationship 2). For this reason, it is believed that the rubber composition provided by the present invention exhibits excellent wet grip performance when thermally damaged, while maintaining good processability.

Examples of such techniques for satisfying relationships 1) and 2) include: a) incorporating an appropriate amount of a liquid polymer; b) incorporating an appropriate amount of a resin; c) incorporating a softener such as a liquid polymer and a resin in an appropriately adjusted combined amount; d) incorporating an appropriate amount of a filler such as silica or carbon black, and other techniques, which may be used alone or in any combination.

From the standpoints of wet grip performance after thermal damage and processability, the rubber composition (vulcanized rubber composition) has an acetone extractable content before heat aging (denoted by "AEf", in % by mass) that satisfies the following relationship 1):
1) $AEf \geq 16.0\%$.

The lower limit of AEf is preferably 19.0% or higher, more preferably 22.0% or higher. The upper limit of AEf is not particularly limited, but is preferably 50.0% or lower, more preferably 40.0% or lower, still more preferably 30.0% or lower.

From the standpoint of wet grip performance after thermal damage, the rubber composition (vulcanized rubber composition) has acetone extractable contents before and after heat aging (denoted by "AEf" and "AEo", respectively, in % by mass that satisfy the following relationship 2):

2) AEo/AEf×100≥95%.

The lower limit is preferably 96% or higher, more preferably 97% or higher. The upper limit is not particularly limited, and a higher percentage is better. The upper limit is most preferably 100%.

The acetone extractable content can be determined by a method for measuring acetone extractable content according to JIS K6229:2015. The heat aging is carried out under heat aging conditions (80° C., 168 hours) in accordance with JIS K6257:2010.

From the standpoint of wet grip performance, the rubber component of the rubber composition preferably includes styrene-butadiene rubber (SBR).

From the standpoint of wet grip performance after thermal damage, the amount of the SBR based on 100% by mass of the rubber component in the rubber composition is preferably 30% by mass or more, more preferably 55% by mass or more, still more preferably 70% by mass or more. The upper limit is not particularly limited, but is preferably 95% by mass or less, more preferably 90% by mass or less.

The SBR preferably has a styrene content of 5% by mass or higher, more preferably 10% by mass or higher, still more preferably 15% by mass or higher, but preferably 60% by mass or lower, more preferably 30% by mass or lower, still more preferably 25% by mass or lower. When the styrene content is within the range indicated above, good wet grip performance after thermal damage tends to be obtained. The styrene content is determined by $^1$H-NMR analysis.

Any SBR containing styrene and butadiene units may be used. Examples include emulsion-polymerized styrene-butadiene rubber (E-SBR) and solution-polymerized styrene-butadiene rubber (S-SBR). The combined content of styrene and butadiene units of the SBR is, for example, 95% by mass or higher based on 100% by mass of the rubber. The combined content may be 98% by mass or higher or 100% by mass. These SBRs may be used alone, or two or more of these may be used in combination.

The SBR may be either an unmodified or modified SBR. The modified SBR may be any SBR having a functional group interactive with a filler such as silica. For example, it may be a chain end-modified SBR obtained by modifying at least one chain end of SBR, with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SEP in which the backbone has the functional group, and at least one chain end is modified with the modifier); or a chain end-modified SBR that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Preferred among these are amino (preferably amino whose hydrogen atom is replaced with a C1-C6 alkyl group), alkoxy (preferably C1-C6 alkoxy), alkoxysilyl (preferably C1-C6 alkoxysilyl), and amide groups.

Examples of modifiers that may be used in the modified SBR include: polyglycidyl ethers of polyhydric alcohols such as ethylene glycerol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and poloxidized liquid polybutadiene; epoxy group-containing tertiary amines such as 4,4'-diglycidyl-diphenylmethylamine and 4,4'-diglycil-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl) carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis (glycidyloxypropyl)-tetramethyldisiloxane and (3-glycidyloxypropyl)-pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl) propyl]sulfide, (trimethylsilyl) [3-(tributoxysilyl)propyl]sulfide, (trimethylsilyl) [3-(methyldimethoxysilyl)propyl]sulfide, (trimethylsilyl) [3-(methyldiethoxysilyl)propyl]sulfide, (trimethylsilyl) [3-(methyldipropoxysilyl)propyl]sulfide, and (trimethylsilyl) [3-(methyldibutoxysilyl)propyl]sulfide;

N-substituted aziridine compounds such as ethyleneimine and propyleneimine; alkoxysilanes such as methyltriethoxysilane, N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, and N,N-bis(trimethylsilyl)amincethyltriethoxysilane; (thio) benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino) benzophenone, 4,4'-bis(diethylamino)benzophenone, 4,4'-bis(diphenylamino)benzophenone, and N,N,N',N'-bis (tetraethylamino)benzophehone; benzaldehyde compounds containing amino and/or substituted amino groups, such as 4-N, N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam;

N,N-bis(2,3-epoxypropoxy)aniline, 4,4-methylene-bis(N, N-glycidylaniline), tris(2,3-epoxypropyl)-1,3,5-triazine-2,4, 6-triones, N,N-diethylacetamide, N-methylmaleimide, N,N-diethylurea, 1,3-dimethylethylene urea, 1,3-divinylethylene urea, 1,3-diethyl-2-imidazolidinone, 1-methyl-3-ethyl-2- imidazolidinone, 4-N,N-dimethylaminoacetophenone, 4-N,N-diethylaminoacetophenone, 1,3-bis(diphenylamino)-2-propanone, and 1,7-bis(methylethylamino)-4-heptanone.

The modification with these compounds (modifiers) can be carried out by known methods.

The SBR may be a commercial product manufactured or sold by, for example, Sumitomo Chemical Co., Ltd., JSR Corporation, Asahi Kasel Corporation, or Soon Corporation.

The rubber component of the rubber composition preferably includes polybutadiene rubber (BR).

The amount of the BR based on 100% by mass of the rubber component in the rubber composition is preferably 5% by mass or more, more preferably 10% by mass or more, still more preferably 15% by mass or more. The upper limit of the amount is preferably 60% by mass or less, more preferably 40% by mass or less, still more preferably 30% by mass or less. When the amount is adjusted within the range indicated above, good wet grip performance after thermal damage tends to be obtained.

The BR preferably has a cis content of 90% by mass or higher, more preferably 95% by mass or higher, still more preferably 98% by mass or higher. The upper limit of the cis content is not particularly limited. When the cis content is within the range indicated above, the advantageous effect tends to be better achieved.

The cis content of the BR can be determined by infrared absorption spectrometry.

The BR may be any polymer mainly having butadiene units. Examples include high-cis BR, low-cis BR, and BR containing syndiotactic polybutadiene crystals. These may be used alone, or two or more of these may be used in combination. The butadiene unit content of the BR is, for example, 95% by mass or higher based on 100% by mass of the rubber. The butadiene unit content may be 98% by mass or higher or 100% by mass. Rubbers containing both butadiene and styrene units correspond to SBR, not BR.

The BR may be either an unmodified or modified BR. Examples of the modified BR include those into which the above-mentioned functional groups are introduced. The BR may be a commercial product available from, for example, Ube Industries, Ltd., JSR Corporation, Asahi Kasei Corporation, or Zeon Corporation.

From the standpoint of wet grip performance after thermal damage, the combined amount of the SBR and BR based on 100% by mass of the rubber component in the rubber composition is preferably 60% by mass or more, more preferably 80% by mass or more, still more preferably 90% by mass or more, and may be 100% by mass.

The rubber component of the rubber composition may include additional rubbers other than SBR and BR. Examples of such additional rubbers include isoprene-based rubbers such as polyisoprene rubber (IR), epoxidized polyisoprene, rubber, hydrogenated polyisoprene rubber, grafted polyisoprene rubber, natural rubber (NR) deproteinized natural rubber (DPNR) highly purified natural rubber (UPNR) epoxidized natural rubber (ENR), hydrogenated natural rubber (HNR), and grafted natural rubber; chloroprene rubber (CR), and acrylonitrile butadiene rubber (NBR). These may be used alone, or two or more of these may be used in combination.

The rubber composition preferably contains silica. The use of silica provides good wet grip performance, etc.

The amount of the silica per 100 parts by mass of the rubber component is preferably 20 parts by mass or more, more preferably 50 parts by mass or more, still more preferably 80 parts by mass or more, particularly preferably 90 parts by mass or more. When the amount is not less than the lower limit, good wet grip performance after thermal damage tends to be obtained. The amount is preferably 200 parts by mass or less, more preferably 150 parts by mass or less, still more preferably 120 parts by mass or less. When the amount is not more than the upper limit, good processability tends to be obtained.

The silica preferably has a nitrogen adsorption specific surface area ($N_2SA$) of 40 $m^2/g$ or more, more preferably 80 $m^2/g$ or more, still more preferably 100 $m^2/g$ or more, but preferably 300 $m^2/g$ or less, more preferably 200 $m^2/g$ or less, still more preferably 180 $m^2/g$ or less. When the $N_2SA$ is within the range indicated above, good grip performance tends to be obtained.

The nitrogen adsorption specific surface are of the silica is determined by the BET method in accordance with ASTM 03037-81.

Examples of the silica include dry silica (anhydrous silica) and wet silica (hydrous silica). Wet silica is preferred because it contains a large number of silanol groups. Commercial products available from Degussa, Rhodia, Tosoh Silica. Corporation, Solvay Japan, Tokuyama Corporation, etc. may be used.

The rubber composition preferably contains carbon black. This provides good wet grip performance, etc. Any carbon black may be used, and examples include GPF, FEF, HAF, ISAF, and SAF.

The amount of the carbon black per 100 parts by mass of the rubber component is preferably 3 parts by mass or more, more preferably 5 parts by mass or more, still more preferably 7 parts by mass or more. When the amount is not less than the lower limit, wet grip performance tends to be improved. The amount of the carbon black is also preferably 40 parts by mass or less, more preferably 30 parts by mass or less, still more preferably 20 parts by mass or less. When the amount is not more than the upper limit, good processability, etc. tend to be obtained.

The carbon black preferably has a nitrogen adsorption specific surface area ($N_2SA$) of 50 $m^2/g$ or more, more preferably 100 $m^2/g$ or more, still more preferably 130 $m^2/g$ or more. When the $N_2SA$ is not less than the lower limit, wet grip performance tends to be improved. The $N_2SA$ of the carbon black is also preferably 200 $m^2/g$ or less, more preferably 180 $m^2/g$ or less, still more preferably 160 $m^2/g$ or less. When the $N_2SA$ is not more than the upper limit, good processability, etc. tend to be obtained.

The $N_2SA$ of the carbon black can be determined by the method A in accordance with JIS K6217-7.

The carbon black may be a commercial product of, for example, Asahi Carbon Co., Ltd., Cabot Japan K. K., Tokai Carbon Co., Ltd., Mitsubishi Chemical Corporation, Lion Corporation, NSCC Carbon Co., Ltd., or Columbia Carbon.

The rubber composition may contain additional fillers (reinforcing fillers) other than carbon black and silica. Examples of such additional fillers include, but are not limited to, calcium carbonate, talc, alumina, clay, aluminum hydroxide, aluminum oxide, and mica.

The amount of fillers per 100 parts by mass of the rubber-component is preferably 50 parts by mass or more, more preferably 70 parts by mass or more, still more preferably 90 parts by mass or more, particularly preferably 105 parts by mass or more. When the amount is not less than the lower limit, wet grip performance tends to be improved. The amount of fillers is also preferably 200 parts by mass or less, more preferably 150 parts by mass or less, still more preferably 130 parts by mass or less. When the amount is not more than the upper limit, good processability, etc. tend to be obtained.

The rubber composition, when containing silica, preferably further contains a silane coupling agent. This tends to provide good strength, etc.

The amount of the silane coupling agent per 100 parts by, mass of the silica is preferably 0.1 parts by mass or more, more preferably 2 parts by mass or more, still more preferably 3 parts by mass or more, but is preferably 20 parts by mass or less, more preferably 16 parts by mass or less, still more preferably 12 parts by mass or less. When the amount is adjusted within the range indicated above, good grip performance tends to be obtained.

Examples of the silane coupling agent include, but are not limited to, sulfide silane coupling agents such as bis(3-triethoxysilylpropyl)tetrasulfide, bis(2-triethoxysilylethyl) tetrasulfide, bis 4-triethoxysilylbutyl)tetrasulfide, bis(3-trimethoxysilylpropyl)tetrasulfide, bis(2-trimethoxysilylethyl)tetrasulfide, bis(2-triethoxysilylethyl) trisulfide, bis(4-trimethoxysilylbutyl)trisulfide, bis(3-triethoxysilylpropyl)disulfide, bis(2-triethoxysilylethyl) disulfide, bis(4-triethoxysilylbutyl)disulfide, bis(3-trimethoxysilylpropyl)disulfide, bis(2-trimethoxysilylethyl) disulfide, bis(4-trimethoxysilylbutyl)disulfide, 3-trimethoxysilylpropyl-N, N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT, and NXT-Z both available from Momentive; vinyl silane coupling agents such as vinyl triethoxysilane and vinyltrimethoxysilane; amino silane coupling agents such as 3-aminopropyltriethoxysilane and 3-aminopropyltrimethoxysilane; glycidoxy silane coupling agents such as γ-glycidoxygropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilano and 3-chloropropyltriethoxysilane. These may be used alone, or two or more of these may be used in combination. To achieve the advantageous effect well, sulfide or mercapto silane coupling agents are preferred among these.

The rubber composition preferably contains a resin. This tends to provide good wet grip performance after thermal damage.

The amount of the resin (the total amount of all resins) per 100 parts by mass of the rubber component is preferably 5 parts by mass or more, more preferably 10 parts by mass or more, still more preferably 20 parts by mass or more, particularly preferably 25 parts by mass or more, but is preferably 50 parts by mass or less, more preferably 40 parts by mass or less. When the amount is adjusted within the range indicated above, good wet grip performance after thermal damage tends to be obtained.

The term "resin" refers to a polymer (solid resin) that is solid at 25° C. Examples include terpene resins, styrene resins, rosin resins, coumarone-indene resins, p-t-butylphenol acetylene resins, acrylic resins, C5 resins, and C9 resins. These may be used alone, or two or more of these may be used in combination. Terpene or styrene resins are preferred among these.

Examples of the terpene resins include polyterpene resins produced by polymerization of terpene compounds, and aromatic modified terpene resins produced by polymerization of terpene compounds and aromatic compounds. Hydrogenated products of the foregoing resins may also be used.

The term "polyterpene resins" refers to resins produced by polymerization of terpene compounds. The term "terpene compounds" refers to hydrocarbons having a composition represented by $(C_5H_8)_n$ and oxygen-containing derivatives thereof, which have a terpene backbone and are classified into monoterpenes ($C_{10}H_{16}$), sesquiterpenes ($C_{15}H_{24}$) diterpenes ($C_{20}H_{32}$), etc. Examples of the terpene compounds include α-pinene, α-pinene, dipentene, limonene, myrcene, alloocimene, ocimene, α-phellandrene, α-terpinene, γ-terpinene, terpinolene, 1,8-cineole, α-terpineol, β-terpineol, and γ-terpineol.

Examples of the polyterpene resins include resins made from the above-mentioned terpene compounds, such as pinene resins, limonene resins, dipentene resins, and pinene-limonene resins. Among these, pinene resins are preferred. Pinene resins, which usually contain two isomers, i.e. α-pinene and β-pinene, are classified into β-pinene resins mainly containing β-pinene and α-pinene resins mainly containing α-pinene, depending on the proportions of the components in the resins.

Examples of the aromatic modified terpene resins include terpene phenol resins made from terpene compounds and phenolic compounds, and terpene styrene resins made from terpene compounds and styrene compounds. Terpene phenol styrene resins made from terpene compounds, phenolic compounds, and styrene compounds may also be used.

The weight average molecular weight (Mw) of the terpene resins is preferably 1000 or more, more preferably 2350 or more, but is preferably 5000 or less, more preferably 4000 or less.

The number average molecular weight (Mn) of the terpene resins is preferably 500 or more, more preferably 830 or more, but is preferably 3000 or less, more preferably 2000 or less.

Herein, the Mw and Mn may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The softening point of the terpene resins is preferably 50° C. or higher, more preferably 80° C. or higher, but is preferably 180° C. or lower, more preferably 130° C. or lower.

In the present invention, the softening point of the resins is determined in accordance with JIS K 6220-1:2001 using a ring and ball softening point measuring apparatus and defined as the temperature at which the ball drops down.

When a terpene resin is present, the amount of the terpene resin per 100 parts by mass of the rubber component is preferably 5 parts by mass or more, more preferably 10 parts by mass or more, still more preferably 20 parts by mass or more, particularly preferably 25 parts by mass or more, but is preferably 50 parts by mass or less, more preferably 40 parts by mass or less. When the amount is adjusted within the range indicated above, good wet grip performance after thermal damage tends to be obtained.

The term "styrene resins" refer to polymers containing styrenic monomers as structural monomer components, and examples include polymers produced by polymerization of styrenic monomers as main components (at least 50% by mass). Specific examples include homopolymers produced by polymerization of styrenic monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerization of two or more styrenic monomers, and copolymers of styrenic monomers and additional monomers copolymerizable therewith.

Examples of the additional monomers include acrylonitriles such as acrylonitrile and methacrylonitrile; unsaturated carboxylic acids such as acrylic acid and methacrylic acid; unsaturated carboxylic acid esters such as methyl acrylate and methyl methacrylate; conjugated dienes such as terpenes, chloroprene, butadiene, and isoprene; olefins such as 1-butene and 1-pentene; and α, β-unsaturated carboxylic acids and acid anhydrides thereof such as maleic anhydride. These may be used alone, or two or more of these may be used in combination.

From the standpoint of wet grip performance after thermal damage, α-methylstyrene resins (e.g., α-methylstyrene homopolymers, copolymers of α-methylstyrene and styrene) are preferred among the styrene resins, with copolymers of α-methylstyrene and styrene being more preferred.

The softening point of the styrene resins is preferably 30° C. or higher, more preferably 60° C. or higher, but is preferably 120° C. or lower, more preferably 85° C. or lower. When the softening point is within the range indicated above, good wet grip performance after thermal damage tends to be obtained.

The number average molecular weight (Mn) of the styrene resins is preferably 500 or more, more preferably 700 or more, but is preferably 3000 or less, more preferably 2000 or less. When the Mn is within the range indicated above, good wet grip performance after thermal damage tends to be obtained.

When a styrene resin is present, the amount of the styrene resin per 100 parts by mass of the rubber component is preferably 5 parts by mass or more, more preferably 10 parts by mass or more, still more preferably 20 parts by mass or more, particularly preferably 25 parts by mass or more, but is preferably 50 parts by mass or less, more preferably 40 parts by mass or less. When the amount is adjusted within the range indicated above, good wet grip performance after thermal damage tends to be obtained.

Examples of commercial products of the terpene resins, styrene resins, and other resins include products of Maruzen Petrochemical Co., Ltd., Sumitomo Bakelite Co., Ltd., Yasuhara Chemical Co, Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., and Taoka Chemical Co. Ltd.

From the standpoint of wet grip performance after thermal damage, the rubber composition preferably contains a liquid polymer. The term "liquid polymer" refers to a polymer that is liquid at room temperature (25° C.)

The amount of the liquid polymer (the total amount of all liquid polymers) per 100 parts by mass of the rubber component is preferably 5 parts by mass or more, more preferably 10 parts by mass or more, still more preferably 15 parts by mass or more. When the amount is not less than. The lower limit, good wet grip performance after thermal damage tends to be obtained. The amount is also preferably 70 parts by, mass or less, more preferably 50 parts by mass or less, still more preferably 30 parts by mass or less. When the amount is not more than the upper limit, good processability tends to be obtained.

The liquid polymer may suitably be a liquid diene polymer or a liquid farnesene polymer.

The amount of the liquid diene polymer per 100 parts by mass of the rubber component is preferably 5 parts by mass or more, more preferably 10 parts by mass or more, still more preferably 15 parts by mass or more. When the amount is not less than the lower limit, good wet grip performance after thermal damage tends to be obtained. The amount is also preferably 70 parts by mass or less, more preferably 50 parts by mass or less, still more preferably 30 parts by mass or less. When the amount is not more than the upper limit, good processability tends to be obtained.

The liquid diene polymer preferably has a polystyrene equivalent weight average molecular weight (Mw) of $1.0 \times 10^3$ to $2.0 \times 10^5$, more preferably $3.0 \times 10^3$ to $1.5 \times 10^4$, as measured by gel permeation chromatography (GPC).

Examples of the liquid diene polymer include liquid styrene-butadiene copolymers (liquid SBR) liquid polybutadiene polymers (liquid BR), liquid polyisoprene polymers (liquid IR), and liquid styrene-isoprene copolymers (liquid SIR).

The term "liquid farnesene polymer" refers to a polymer produced by polymerizing farnesene as a monomer component. Examples include the polymers described in JP 2016-180118 A which is hereby incorporated by reference.

The amount of the liquid farnesene polymer per 100 parts by mass of the rubber component is preferably 5 parts by mass or more, more preferably 10 parts by mass or more, still more preferably 15 parts by mass or more. When the amount is not less than the lower limit, good wet grip performance after thermal damage tends to be obtained. The amount is also preferably 70 parts by mass or less, more preferably 50 parts by mass or less, still more preferably 30 parts by mass or less. When the amount is not more than the upper limit, good processability tends to be obtained.

The liquid farnesene polymer may be a homopolymer of farnesene (farnesene homopolymer) or a copolymer of farnesene and a vinyl monomer (farnesene-vinyl monomer copolymer). The vinyl monomer may suitably be styrene or butadiene.

The farnesene homopolymer preferably has a glass transition temperature (Tg) of −60° C. or lower, more preferably −70° C. or lower, but preferably −120° C. or higher, more preferably −110° C. or higher. The farnesene-styrene copolymer preferably has a Tg of −15° C. or lower, more preferably −30° C. or lower, but preferably −80° C. or higher, more preferably −70° C. or higher. The farnesene-butadiene copolymer preferably has a Tg of −60° C. or lower, more preferably −70° C. or lower, but preferably −120° C. or higher, more preferably −110° C. or higher.

The Tg is measured using a differential scanning calorimeter (Q200, TA Instruments Japan) at a temperature increase rate of 10° C./min in accordance with JIS K 7121:1987.

The farnesene homopolymer preferably has a weight average molecular weight (Mw) of 3,000 or more, more preferably 5,000 or more, still more preferably 8,000 or more, but preferably 500,000 or less, more preferably 300,000 or less, still more preferably 150,000 or less. The farnesene-vinyl monomer copolymer preferably has a Mw of 3,000 or more, more preferably 5,000 or more, still more preferably 8,000 or more, but preferably 500,000 or less, more preferably 300,000 or less, still more preferably 150,000 or less, particularly preferably 100,000 or less.

The farnesene homopolymer preferably has a melt, viscosity of 1000 Pa·s or less, more preferably 200 Pa·s or less, but, preferably 0.1 Pa·s or more, more preferably 0.5 Pa·s or more. The farnesene-vinyl monomer copolymer preferably has a melt viscosity of 1000 Pa·s or less, more preferably 650 Pa·s or less, still more preferably 200 Pa·s or less, but preferably 1 Pa·s or more, more preferably 5 Pa·s or more.

The melt viscosity is measured at 38° C. using a Brookfield viscometer (BROOKFIELD ENGINEERING LABS. INC.)

The farnesene homopolymer preferably has a farnesene content of 80% by mass or higher, more preferably 90% by mass or higher based on 100% by mass of the total monomer components. The farnesene content may be 100% by mass.

The farnesene-vinyl monomer copolymer preferably has a combined content of farnesene and vinyl monomer of 80% by mass or higher, more preferably 90% by mass or higher based on 100% by mass of the total monomer components. The combined content may be 100% by mass. Moreover, the farnesene/vinyl monomer copolymerization ratio, farnesene: vinyl monomer, is preferably 99/1 to 25/75, more preferably 80/20 to 40/60 by mass.

The combined amount of the resin and the liquid polymer per 100 parts by mass of the rubber component in the rubber composition is preferably 30 parts by mass or more, more preferably 40 parts by mass or more, still more preferably 45 parts by mass or more, but is preferably 100 parts by mass or less, more preferably 80 parts by mass or less, still more preferably 70 parts by mass or less. When the combined amount is adjusted within the range indicated above, good wet grip performance after thermal damage and good processability tend to be obtained. In the case where a terpene resin and/or styrene resin is used as the resin, and a liquid diene polymer and/or liquid farnesene polymer is used as the liquid polymer, the combined amount of these components is suitably within a range as indicated above.

The rubber composition preferably contains sulfur (sulfur vulcanizing agent).

Examples of the sulfur include those commonly used in the rubber industry, such as powdered sulfur, precipitated sulfur, colloidal sulfur, insoluble sulfur, highly dispersible sulfur, and soluble sulfur. Commercial products available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. may be used. These may be used alone, or two or more of these may be used in combination.

The amount of the sulfur (sulfur vulcanizing agent) per 100 parts by mass of the rubber component is preferably 0.2 parts by mass or more, more preferably 0.5 parts by mass or more, still more preferably 0.7 parts by mass or more. When the amount is not less than the lower limit, good wet grip performance after thermal damage tends to be obtained. The upper limit of the amount is not particularly limited, but is preferably 5.0 parts by mass or less, more preferably 3.0 parts by mass or less, still more preferably 2.0 parts by mass or less.

The rubber composition preferably contains a vulcanization accelerator.

Examples of the vulcanization accelerator include thiazole vulcanization accelerators such as 2-mercaptobenzothiazole, di-2-benzothiazolyl disulfide (DM, 2,2'-dibenzothiazolyl disulfide), and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-di-isopropyl-2-benzothiazole sulfenamide; and guanidine vulcanization accelerators such as diphenylguanidine, diorthotolylguanidine, and orthotolylbiguanidine. These may be used alone, or two or more of these may be used in combination. Among these, sulfonamide or thiazole vulcanization accelerators are preferred.

The amount of the vulcanization accelerator per 100 parts by mass of the rubber component is preferably 0.5 parts by mass or more, more preferably 1.0 part by mass or more, still more preferably 1.5 parts by mass or more, but is preferably 5.0 parts by mass or less, more preferably 3.0 parts by mass or less, still more preferably 2.0 parts by mass or less. When the amount is within the range indicated above, good wet grip performance after thermal damage tends to be obtained.

The rubber composition may contain a wax, Examples of the wax include, but are not limited to, petroleum waxes such as paraffin waxes and microcrystalline waxes; naturally-occurring waxes such as plant waxes and animal waxes; and synthetic waxes such as polymers of ethylene, propylene, or other similar monomers. Commercial products available from Ouchi Shinko Chemical Industrial Co., Ltd., Nippon Seiro Co., Ltd., Seiko Chemical. Co., Ltd., etc. may be used. These may be used alone, or two or more of these may be used in combination. Among these, petroleum waxes are preferred, with paraffin waxes being more preferred.

The amount of the wax per 100 parts by mass of the rubber component is preferably 0.5 parts by mass or more, more preferably 1 part by mass or more, but is preferably 10 parts by mass or less, more preferably 6 parts by mass or less.

The rubber composition preferably contains an antioxidant.

Examples of the antioxidant include, but are not limited to, naphthylamine antioxidants such as phenyl-α-naphthhylamine; diphenylamine antioxidants such as octylated diphenylamine and 4,4'-bis(α, α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenatedanol; and bis-, tris-, or polyphenolic antioxidants such as tetrakis-[methylene-3-(3',5'-di-t-butyl-4'-hydroxyphenyl)propionate] methane. Commercial products available from. Seiko Chemical. Co., Ltd., Sumitomo Chemical Co., Ltd., Ouchi Shinko Chemical Industrial Co., Ltd., Flexsys, etc. may be used. These may be used alone, or two or more of these may be used in combination. Preferred among these are p-phenylenediamine antioxidants, more preferably N-(1,3-dimethylbutyl)-N'-p-phenylenediamine.

The amount of the antioxidant per 100 parts by mass of the rubber component is preferably 0.5 parts by mass or more, more preferably 1.5 parts by mass or more, but is preferably 7.0 parts by mass or less, more preferably 4.0 parts by mass or less.

The rubber composition preferably contains a fatty acid, in particular stearic acid.

The stearic acid may be a conventional one and examples include commercial products of NOF Corporation, Kao Corporation, FUJIFILM Wako Pure Chemical Corporation, and Chiba Fatty Acid Co., Ltd.

The amount of the fatty acid per 100 parts by mass of the rubber component is preferably 0.5 parts by mass or more, more preferably 1.0 part by mass or more, but is preferably 10.0 parts by mass or less, more preferably 5.0 parts by mass or less.

The rubber composition preferably contains zinc oxide.

The zinc oxide may be a conventional one, and examples include commercial products of Mitsui Mining & Smelting Co., Ltd., Toho Zinc Co., Ltd., HakusuiTech Co., Ltd., Seido Chemical industry Co., Ltd., and Sakai Chemical Industry Co., Ltd.

The amount of the zinc oxide per 100 parts by mass of the rubber component is preferably 0.5 parts by mass or more, more preferably 1.0 part by mass or more, but is preferably 5.0 parts mass or less, more preferably 3.0 parts by mass or less.

In addition to the above-mentioned components, the rubber composition may contain additives commonly used in the tire industry, such as processing aids and surfactants.

The tread rubber composition (vulcanized tread rubber composition) may be prepared by known methods, such as by kneading the components using a rubber kneading machine such as an open roll mill, a Banbury mixer, or a kneader, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, and preferably 85 to 110° C. The composition obtained after kneading vulcanizing agents and vulcanization accelerators is usually vulcanized by, for example, press vulcanization. The vulcanization temperature is usually 140 to 190° C., preferably 150 to 185° C.

The pneumatic tire of the present invention can be produced using the rubber composition by usual methods. Specifically, the unvulcanized rubber composition containing the components may be extruded into the shape of a tread (a component that comes in contact with the road, such as a monolayer tread or a cap tread of a multi-layer tread) and assembled with other tire components on a tire building machine in a usual manner to build an unvuicanized tire, which may then be heated and pressurized in a vulcanizer to obtain a tire.

The tire may be used as, for example, a tire for passenger vehicles, large passenger vehicles, large SUVs, heavy load vehicles such as trucks and buses, light trucks, or two-wheeled vehicles, or as a racing tire (high performance tire).

EXAMPLES

The present invention is specifically described with reference to examples, but the present invention is not limited to the examples.

The chemicals used in the examples and comparative examples are listed below.

SBR: Nipol 1502 available from Zeon Corporation (E-SBR, styrene content: 24% by mass, vinyl content: 16% by mass, unmodified SBR)
BR: BR150B available from Ube industries, Ltd. (cis content: 98% by mass)
Carbon black: SHOBLACK N110 available from Cabot Japan K.K. ($N_2SA$: 145 $m^2/g$)
Silica: Ultrasil VN3 available from Degussa ($N_2SA$: 175 $m^2/g$)
Silane coupling agent: Si69 (bis(3-triethoxysilyl-propyl) tetrasulfide) available from Evonik Degussa
Oil: Diana Process Oil NH-60 available from Idemitsu Kosan Co., Ltd.
Resin 1: SYLVARES SA85 available from Arizona Chemical (α-methylstyrene resin (a copolymer of α-methylstyrene and styrene), softening point: 85° C., Tg: 43° C.)
Resin 2: Sylvatraxx 4150 available from Arizona Chemical (β-pinene resin, β-pinene content: at least 98% by mass, Mw: 2350, Mn: 830)
Resin 3: YS resin TO125 available from Yasuhara Chemical Co., Ltd. (aromatic modified terpene resin, softening point: 125° C.)
Liquid polymer 1: RICON 100 available from Sartomer (liquid SBR, styrene content: 25% by mass, Mw: 4500)
Liquid polymer 2: FBR-746 available from Kuraray Co., Ltd. (farnesene-butadiene copolymer, Mw: 100,000, copolymerization ratio: farnesene/butadiene=60/40 by mass, melt viscosity: 603 Pa·s, Tg: −78° C.)
Wax: Ozoace 0355 available from Nippon Seiro Co., Ltd.
Antioxidant: Antigene 6C (N-(1,3-dimethylbutyl)-N'-phenyl-p-phenylenediamine) available from Sumitomo Chemical Co., Ltd.
Stearic acid: stearic acid "TSUBAKI" available from NOF Corporation
Zinc oxide: Ginrei R available from Toho Zinc Co., Ltd.
Sulfur: HK-200-5 available from Hosoi Chemical Industry Co., Ltd. (5% oil-containing powdered sulfur)
Vulcanization accelerator: NOCCELER CZ (N-cyclohexyl-2-benzothiazole sulfenamide) available from Ouchi Shinko Chemical Industrial Co., Ltd.

Examples and Comparative Examples

The chemicals other than the sulfur and vulcanization accelerator in the amounts shown in Table 1 or 2 were kneaded using a 1.7 L Banbury mixer (Kobe Steel, Ltd.) at 150° C. for 5 minutes to give a kneaded mixture. Then, the sulfur and vulcanization accelerator were added to the kneaded mixture, and they were kneaded using an open roll mill at 80° C. for 5 minutes to give an unvulcanized rubber composition.

The unvulcanized rubber composition was formed into a tread shape and assembled with other tire components to build an unvulcanized tire. The unvulcanized tire was press-vulcanized at 150° C. for 30 minutes to prepare a test tire (size: 215/45R17).

Heat Aging

The fresh test tires (before heat aging) were left at 80° C. for 168 hours in accordance with JIS K6257:2010 to obtain heat-aged test tires.

The test tires and the unvulcanized rubber compositions were evaluated as described below. Tables 1 and 2 show the results. Comparative Example 1-1 and Comparative Example 2-1 are used as standards of comparison in Tables 1 and 2, respectively.

Acetone Extractable Content Before Heat Aging or Initial Acetone Extractable Content (AEf)

Specimens of the rubber compositions (vulcanized rubber compositions) alone were cut out from the treads of the test tires before heat aging. The amount of material extractable with acetone (extractable content: % by mass) in the rubber composition specimens (before heat aging; was determined by a method for measuring acetone extractable content according to JIS K6229:2015 (the method A).

Acetone Extractable Content After Heat Aging (AEo)

Specimens of the rubber compositions (vulcanized rubber compositions) alone were cut out from the treads of the test tires after heat aging. The amount of material extractable with acetone (extractable content: % by mass) in the rubber composition specimens (after heat aging) was determined by a method for measuring acetone extractable content according to JIS K6229:2015 (the method A).

Wet Grip Performance

The test tire of each example, before and after heat aging, was mounted on each wheel of a front-engine, front-wheel-drive car of 2000 cc displacement made in Japan. The breaking distance of the car with an initial speed of 100 km/h under wet asphalt conditions was determined and expressed as an index, with the standard comparative example before heat aging set equal to 100. A higher index indicates better wet grip performance.

Processability

The Mooney viscosity ($ML_{1+4}/130°$ C.) of the unvulcanized rubber compositions was determined in accordance with JIS K 6300-1 "Rubber, unvulcanized—Physical property—Part 1: Determination, of Mooney viscosity and pre-vulcanization characteristics with Mooney viscometer" using a Mooney viscosity tester as follows. After preheating for one minute up to 130° C., a small rotor was rotated at this temperature, and after a lapse of four minutes the Mooney viscosity was measured. The Mooney viscosity of each example was standardized by dividing by the Mooney viscosity of the standard comparative example and then multiplying by 100 to obtain an index. A higher index indicates a lower viscosity and better processability.

TABLE 1

| | | Example | | | | | | | Comparative Example | | |
|---|---|---|---|---|---|---|---|---|---|---|---|
| | | 1-1 | 1-2 | 1-3 | 1-4 | 1-5 | 1-6 | 1-7 | 1-1 | 1-2 | 1-3 |
| Amount (parts by mass) | SBR | 80 | 80 | 80 | 80 | 80 | 80 | 80 | 80 | 80 | 80 |
| | BR | 20 | 20 | 20 | 20 | 20 | 20 | 20 | 20 | 20 | 20 |
| | Carbon black | 10 | 10 | 10 | 10 | 10 | 10 | 10 | 10 | 10 | 10 |
| | Silica | 100 | 100 | 100 | 100 | 100 | 100 | 100 | 100 | 100 | 100 |
| | Silane coupling agent | 8.0 | 8.0 | 8.0 | 8.0 | 8.0 | 8.0 | 8.0 | 8.0 | 8.0 | 8.0 |
| | Oil | — | — | — | — | — | — | — | 50 | — | 30 |
| | Resin 1 | 30 | — | — | — | 30 | — | — | — | — | 20 |
| | Resin 2 | — | 30 | — | — | — | 30 | — | — | — | — |
| | Resin 3 | — | — | 30 | — | — | — | 30 | — | — | — |
| | Liquid polymer 1 | 20 | 20 | 20 | 50 | — | — | — | — | — | — |
| | Liquid polymer 2 | — | — | — | — | 20 | 20 | 20 | — | 50 | — |
| | Wax | 2.0 | 2.0 | 2.0 | 2.0 | 2.0 | 2.0 | 2.0 | 2.0 | 2.0 | 2.0 |
| | Antioxidant | 2.0 | 2.0 | 2.0 | 2.0 | 2.0 | 2.0 | 2.0 | 2.0 | 2.0 | 2.0 |
| | Stearic acid | 2.0 | 2.0 | 2.0 | 2.0 | 2.0 | 2.0 | 2.0 | 2.0 | 2.0 | 2.0 |
| | Zinc oxide | 2.0 | 2.0 | 2.0 | 2.0 | 2.0 | 2.0 | 2.0 | 2.0 | 2.0 | 2.0 |
| | Sulfur | 1.0 | 1.0 | 1.0 | 1.0 | 1.0 | 1.0 | 1.0 | 1.5 | 1.5 | 1.5 |
| | Vulcanization accelerator | 2.0 | 2.0 | 2.0 | 2.0 | 2.0 | 2.0 | 2.0 | 1.0 | 1.0 | 1.0 |
| Evaluation | Acetone extractable content before heat aging "AEf" (% by mass) | 22.8 | 22.8 | 22.8 | 20.6 | 17.2 | 17.2 | 17.2 | 24.4 | 6.4 | 24.4 |
| | Acetone extractable content after heat aging "AEo" (% by mass) | 22.2 | 22.2 | 22.2 | 19.9 | 16.7 | 16.7 | 16.7 | 19.1 | 6.4 | 21.4 |
| | AEo/AEf × 100 (%) | 97 | 97 | 97 | 97 | 97 | 97 | 97 | 78 | 100 | 88 |
| | Wet grip performance (before heat aging) | 115 | 115 | 115 | 110 | 112 | 112 | 112 | 100 | 95 | 102 |
| | Wet grip performance (after heat aging) | 111 | 110 | 110 | 106 | 110 | 109 | 109 | 90 | 94 | 95 |
| | Processability | 98 | 98 | 98 | 98 | 97 | 97 | 97 | 100 | 97 | 99 |

TABLE 2

| | | Example | | | | | | | Comparative Example | | |
|---|---|---|---|---|---|---|---|---|---|---|---|
| | | 2-1 | 2-2 | 2-3 | 2-4 | 2-5 | 2-6 | 2-7 | 2-1 | 2-2 | 2-3 |
| Amount (parts by mass) | SBR | 90 | 90 | 90 | 90 | 90 | 90 | 90 | 90 | 90 | 90 |
| | BR | 10 | 10 | 10 | 10 | 10 | 10 | 10 | 10 | 10 | 10 |
| | Carbon black | 30 | 30 | 30 | 30 | 30 | 30 | 30 | 30 | 30 | 30 |
| | Silica | 80 | 80 | 80 | 80 | 80 | 80 | 80 | 80 | 80 | 80 |
| | Silane coupling agent | 6.4 | 6.4 | 6.4 | 6.4 | 6.4 | 6.4 | 6.4 | 6.4 | 6.4 | 6.4 |
| | Oil | — | — | — | — | — | — | — | 50 | — | 30 |
| | Resin 1 | 30 | — | — | — | 30 | — | — | — | — | 20 |
| | Resin 2 | — | 30 | — | — | — | 30 | — | — | — | — |
| | Resin 3 | — | — | 30 | — | — | — | 30 | — | — | — |
| | Liquid polymer 1 | 20 | 20 | 20 | 50 | — | — | — | — | — | — |
| | Liquid polymer 2 | — | — | — | — | 20 | 20 | 20 | — | 50 | — |
| | Wax | 2.0 | 2.0 | 2.0 | 2.0 | 2.0 | 2.0 | 2.0 | 2.0 | 2.0 | 2.0 |
| | Antioxidant | 2.0 | 2.0 | 2.0 | 2.0 | 2.0 | 2.0 | 2.0 | 2.0 | 2.0 | 2.0 |
| | Stearic acid | 2.0 | 2.0 | 2.0 | 2.0 | 2.0 | 2.0 | 2.0 | 2.0 | 2.0 | 2.0 |
| | Zinc oxide | 2.0 | 2.0 | 2.0 | 2.0 | 2.0 | 2.0 | 2.0 | 2.0 | 2.0 | 2.0 |

TABLE 2-continued

|  |  | Example |  |  |  |  |  |  | Comparative Example |  |  |
|---|---|---|---|---|---|---|---|---|---|---|---|
|  |  | 2-1 | 2-2 | 2-3 | 2-4 | 2-5 | 2-6 | 2-7 | 2-1 | 2-2 | 2-3 |
|  | Sulfur | 1.0 | 1.0 | 1.0 | 1.0 | 1.0 | 1.0 | 1.0 | 1.5 | 1.5 | 1.5 |
|  | Vulcanization accelerator | 2.0 | 2.0 | 2.0 | 2.0 | 2.0 | 2.0 | 2.0 | 1.0 | 1.0 | 1.0 |
| Evaluation | Acetone extractable content before heat aging "AEf" (% by mass) | 22.3 | 22.3 | 22.3 | 20.1 | 16.8 | 16.8 | 16.8 | 23.8 | 6.5 | 23.8 |
|  | Acetone extractable content after heat aging "AEo" (% by mass) | 21.7 | 21.7 | 21.7 | 19.4 | 16.4 | 16.4 | 16.4 | 18.7 | 6.5 | 20.8 |
|  | AEo/AEf × 100 (%) | 97 | 97 | 97 | 97 | 98 | 98 | 98 | 79 | 100 | 87 |
|  | Wet grip performance (before heat aging) | 115 | 115 | 115 | 110 | 112 | 112 | 112 | 100 | 95 | 102 |
|  | Wet grip performance (after heat aging) | 111 | 110 | 110 | 106 | 110 | 109 | 109 | 90 | 94 | 95 |
|  | Processability | 98 | 98 | 98 | 98 | 97 | 97 | 97 | 100 | 97 | 99 |

As shown in Tables 1 and 2, the examples satisfying relationships 1) and 2) exhibited a slight degradation in wet grip performance after heat aging and an excellent ability to maintain yet grip performance. Moreover, good processability was also ensured in the examples. Furthermore, the examples had excellent wet grip performance before heat aging (initial wet grip performance). Thus, the examples were very excellent in the balance of initial wet grip performance, wet grip performance after thermal damage, and processability.

The invention claimed is:

1. A pneumatic tire, comprising a tread comprising a tread rubber composition, the tread rubber composition having acetone extractable contents before and after heat aging (denoted by "AEf" and "AEo", respectively) that satisfy the following relationships 1) and 2):
   1) AEf≥16.0%; and
   2) AEo/AEf×100≥ 95%; wherein the acetone extractable content is determined by a method for measuring acetone extractable content according to JIS K6229:2015, and the heat aging is carried out under heat aging conditions of 80° C. for 168 hours in accordance with JIS K6257: 2010, wherein in the tread rubber composition, the amount of styrene-butadiene rubber based on 100% by mass of rubber component is 80 to 95% by mass, and the amount of polybutadiene rubber based on 100% by mass of rubber component is 5 to 20% by mass, wherein the tread rubber composition comprises silica, and at least one of a liquid polymer or a resin, and a combined amount of the liquid polymer and the resin per 100 parts by mass of the rubber component in the tread rubber composition is 30 to 100 parts by mass.

2. The pneumatic tire according to claim 1, wherein the tread rubber composition has an acetone extractable content before heat aging "AEf" of 22.0% or higher.

* * * * *